(12) United States Patent
Chen (10) Patent No.: US 10,989,238 B1
(45) Date of Patent: Apr. 27, 2021

(54) ELASTIC FASTENER ASSEMBLY

(71) Applicant: Chin-Da Chen, Miaoli County (TW)

(72) Inventor: Chin-Da Chen, Miaoli County (TW)

( * ) Notice: Subject to any disclaimer, the term of this patent is extended or adjusted under 35 U.S.C. 154(b) by 0 days.

(21) Appl. No.: 16/807,197

(22) Filed: Mar. 3, 2020

(51) Int. Cl.
*F16B 5/04* (2006.01)
*F16B 2/04* (2006.01)
*F16B 17/00* (2006.01)
*B60J 1/02* (2006.01)
*B60J 1/20* (2006.01)

(52) U.S. Cl.
CPC ............... *F16B 5/04* (2013.01); *F16B 2/04* (2013.01); *F16B 17/008* (2013.01); *B60J 1/025* (2013.01); *B60J 1/2091* (2013.01)

(58) Field of Classification Search
CPC .. F16B 2/04; F16B 5/04; F16B 17/008; Y10T 24/45105; B60J 1/2091; B60J 1/025
See application file for complete search history.

(56) References Cited

U.S. PATENT DOCUMENTS

| | | | | |
|---|---|---|---|---|
| 2,152,603 A * | 3/1939 | Pender | ................ | B60R 13/0206 24/581.11 |
| 2,164,014 A * | 6/1939 | Jones | ................ | B60R 13/0206 24/581.11 |
| 2,222,147 A * | 11/1940 | Kral | ................ | F16B 5/06 24/581.11 |
| 4,601,247 A * | 7/1986 | Welch | ................ | A47B 57/20 108/108 |
| 5,269,360 A * | 12/1993 | Chen | ................ | B60J 1/2091 160/84.06 |
| 5,787,956 A * | 8/1998 | Chen | ................ | B60J 1/2091 160/370.23 |
| 8,469,438 B2 * | 6/2013 | Mazur | ................ | F16B 5/0635 296/146.7 |
| 2018/0178635 A1 * | 6/2018 | Berman | ................ | B60J 1/2091 |

* cited by examiner

*Primary Examiner* — Robert Sandy (57) ABSTRACT

Disclosed is an elastic fastener assembly for fastening objects to gap between the car window and the trim panel. The elastic fastener assembly includes an elastic fastener having a first piece for supporting the elastic fastener assembly and a second piece serving as a fastener of the elastic fastener assembly. The second piece has an opening provided with a flange for allowing the elastic fastener to be inserted in a gap between a trim panel and a car window glass to securely fasten the elastic fastener assembly to an inner side of the trim panel. The elastic fastener assembly includes an object jointer for jointing objects. The neck of the object jointer is spaced apart from the flange by a distance longer than the thickness of the trim panel, thereby ensuring the elastic fastener assembly to be fastened to the inner side of the trim panel during the installation process.

9 Claims, 6 Drawing Sheets

ELASTIC FASTENER ASSEMBLY

FIELD OF THE DISCLOSURE

The invention is related to an elastic fastener assembly for fastening an object between a trim panel and a car window glass of a car. More particularly, the invention is related to an elastic fastener assembly that can be installed easily and quickly and dismantled readily for fastening an object to a gap between a trim panel and a car window glass of a car without damaging the trim panel.

BACKGROUND

Cars have become an indispensable commodity for use in daily life. People tend to put some articles in their cars, such as car curtain, driving recorder, or any other necessities. Because the trim panel of a car does not reserve any space for the purpose of fastening, it is difficult to firmly fix objects in the car. More disadvantageously, if it is desired to fasten an object in a car with glue or adhesive or sucker, the object may fall as a result of the rise of ambient temperature. Moreover, if a screw is used to fasten an object, it may damage the surface of the trim panel. Furthermore, it would be strenuous to fasten an object in a car with screw. Thus, people are reluctant to fasten an object in a car with screw.

The applicant endeavors to research and design a novel elastic fastener assembly to address the shortcomings encountered by the prior art and finally devises the inventive elastic fastener assembly through assiduous trials and experiments.

SUMMARY

An object of the invention is to provide a fastener that is easy and quick to install and is capable of easily fastening objects in a car.

To this end, the invention provides an elastic fastener assembly, which includes an elastic fastener having a first piece and a second piece. The first piece is in contact with a car window glass for supporting the elastic fastener assembly and has a planar shape. The second piece serves as the fastener for the elastic fastener assembly. The second piece has an opening provided with a flange for being inserted into a gap between a trim panel and the car window glass, such that the elastic fastener assembly can be securely fastened to the inner side of the trim panel. The elastic fastener assembly further includes an object jointer mounted on the top surface or a side surface of the second piece and may be integrated with the second piece by using various methods and may be shaped depending on the requirements to fasten different objects. One side of the object jointer is close to the flange and is in contact with the trim panel, and the other side of the object jointer is integrated with the object, thereby forming an article. The neck of the object jointer must space apart from the flange by a distance longer than the thickness of the trim panel, such that the elastic fastener assembly can be completely fastened to the inner side of the trim panel during the installation process.

Preferably, the elastic fastener assembly is made up of an elastic material having a U-shape, a V-shape, or an upside-down U-shape.

Preferably, a threaded bore can be mounted in the second piece of the elastic fastener. When the elastic fastener assembly is used to hang a relatively heavy object, a screw may be screwed into the threaded bore to prop the first piece and the second piece open, thereby reinforcing the fastening power of the elastic fastener assembly.

Preferably, the outer opening of the first piece and the outer opening of the second piece may be formed in a flat and straight shape. However, in order to allow the elastic fastener assembly to be applied to a car having a relatively small gap between the trim panel and the car window glass, the outer opening of the first piece and the outer opening of the second piece must be provided with an indentation and a projection, respectively. This can allow the outer openings to interleave with each other and keep the thickness of the elastic fastener assembly to be the thickness of one piece when the elastic fastener assembly is in a close state. Consequently, the elastic fastener assembly can be easily inserted into the relatively small gap between the trim panel and the car window glass of a car.

Preferably, the height of the flange on the opening of the second piece of the elastic fastener must be smaller than the width of the gap to allow the elastic fastener to pass through the gap.

Preferably, the object jointer and the second piece are formed by an integral forming process. Alternatively, the object jointer and the elastic fastener are separately formed and riveted together with a rivet. Alternatively, the object jointer and the elastic fastener are integrated by an inserting and clamping process.

Preferably, the elastic fastener assembly not only can be securely installed in the car, but also can be dismantled from the car without damaging the interior of the car.

Preferably, the number of elastic fastener assembly to be used in a car depends on the requirements on the objects to be fastened.

Preferably, the elastic fastener assembly may be solely installed in the gap between the upper end of the car window glass and the car roof for fastening or hanging objects.

Next, three exemplary embodiments will be given below to illustrate the best mode of the invention. Through these embodiments, the technical means, advantages, and constitution of the inventions cab be readily understood by an artisan skilled in the related art. The first embodiment is a two-piece front windshield pleated curtain combining the inventive elastic fastener assembly. The second embodiment is a one-piece constant-force spring pleated curtain combining the inventive elastic fastener assembly. The third embodiment is a roller curtain combining the inventive elastic fastener assembly.

BRIEF DESCRIPTION OF THE DRAWINGS

To illustrate the technological scheme embodying the embodiment of the invention more clearly, the accompanying drawings showing the embodiment of the invention or the conventional technology will be briefed in the following. Apparently, the accompanying drawings stated below are merely affiliated to some embodiments of the invention. An artisan having ordinary skill in the related art can contrive other drawings based on the accompanying drawings without exerting non-inventive laboring. In the figures.

DETAILED DESCRIPTION OF PREFERRED EMBODIMENTS

Next, the invention will be elaborated clearly and exhaustively with reference to the accompanying drawings. Apparently, the embodiments described herein are merely taken as being illustrative in nature but not limiting to the scope of the disclosure. Based on the embodiments disclosed herein, any embodiments derived by an artisan skilled in the art without inventive laboring should be encompassed in the scope of the disclosure.

Figure 1:
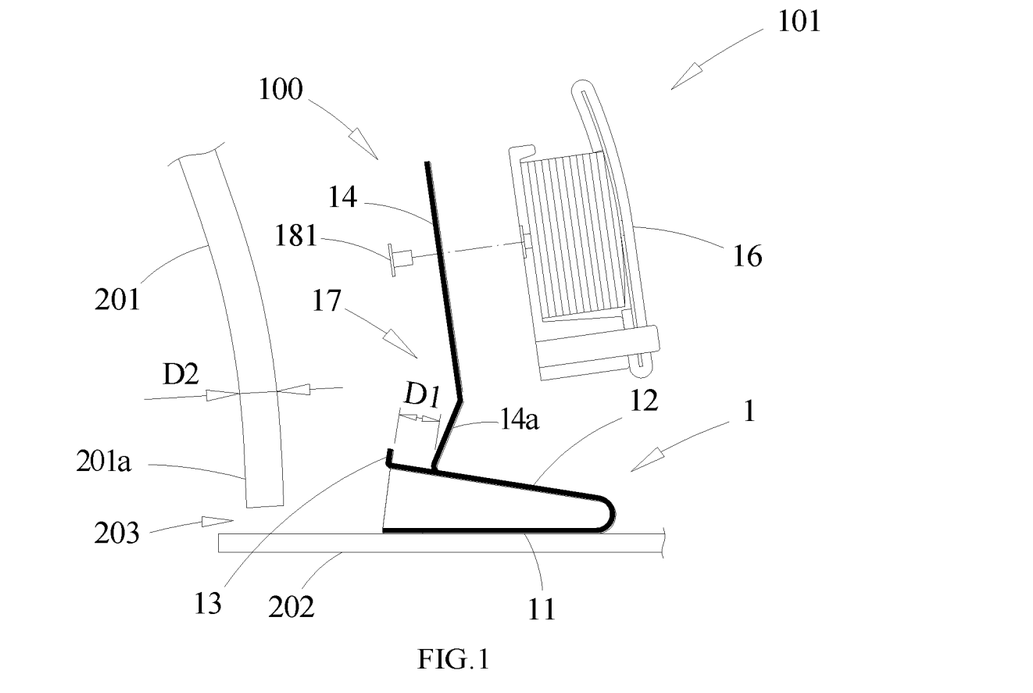
FIG. 1 is a schematic diagram showing the structure of the elastic fastener assembly according to the invention.

Please refer to FIG. 1. An elastic fastener assembly 100 according to the invention includes an elastic fastener 1 having a U-shape and having a first piece 11 and a second piece 12. The first piece 11 is used to contact and support the car window glass 202 and is planarly shaped. The second piece 12 serves as the fastener of the elastic fastener 1. The second piece 12 has an opening provided with a flange 13. The flange 13 is used to be inserted into the gap 203 between the trim panel 201 and the car window glass 202, so as to be securely fastened to the inner side 201a of the trim panel 201. The elastic fastener assembly 100 further includes an object jointer 14 mounted inside the second piece 12. The object jointer 14 may be mounted on the top surface or side surface of the second piece 12 and integrated with the elastic fastener 1 by using various methods. The shape of the object jointer 14 may be formed depending on the requirement to fasten different object 16. The first piece 11, the second piece 12, and the object jointer 14 form the elastic fastener assembly 100.

Figure 2:
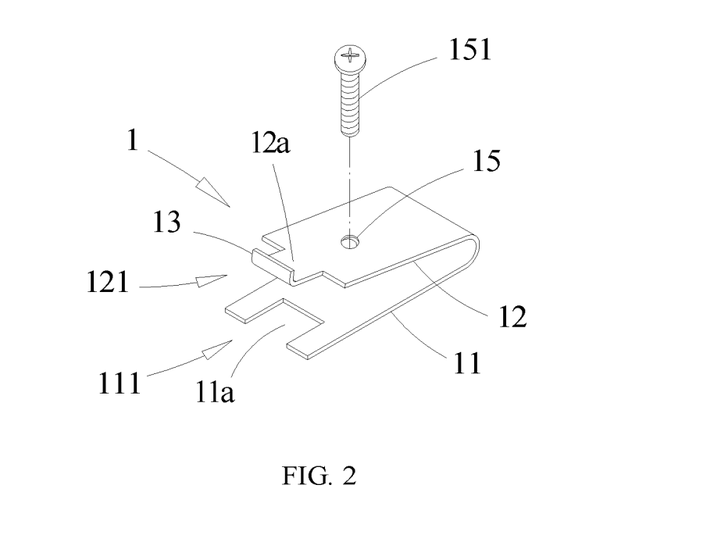
FIG. 2 is a schematic diagram showing the structure of the elastic fastener according to the invention.

Please refer to FIG. 2. The flange 13 on the outer opening 121 of the second piece 12 is spaced apart from the neck 14a of the object jointer 14 by a predetermined distance D1. The predetermined distance D1 must be longer than the thickness D2 of the trim panel 201 to ensure that the flange 13 can be inserted into the inner side 201a of the trim panel 201. In the meantime, the object jointer 14 can prevent the elastic fastener 1 from being exceedingly inserted into the gap 203 between the trim panel 201 and the car window glass 202.

As shown in FIG. 2, the elastic fastener 1 may be made up of an elastic material, such as elastic steel piece, elastic stainless-steel piece, plastic, or any elastic material. The shape of the elastic fastener 1 may be U-shape, V-shape, or upside-down U-shape.

As shown in FIG. 2, the second piece 12 of the elastic fastener 1 may include a threaded bore 15 mounted therein. When the elastic fastener assembly is used to hang a relatively heavy article, a screw 151 may be screwed into the threaded bore 15 to prop the first piece 11 and the second piece 12 open, thereby reinforcing the fastening power of the elastic fastener assembly.

As shown in FIG. 2, the outer opening 111 of the first piece 11 and the outer opening 121 of the second piece 12 of the elastic fastener 1 may respectively include an indentation 11a and a projection 12a, both of which correspond to each other. In this way, when the elastic fastener 1 is closed, the first piece 11 and the second piece 12 will not interfere with each other.

Figure 3:
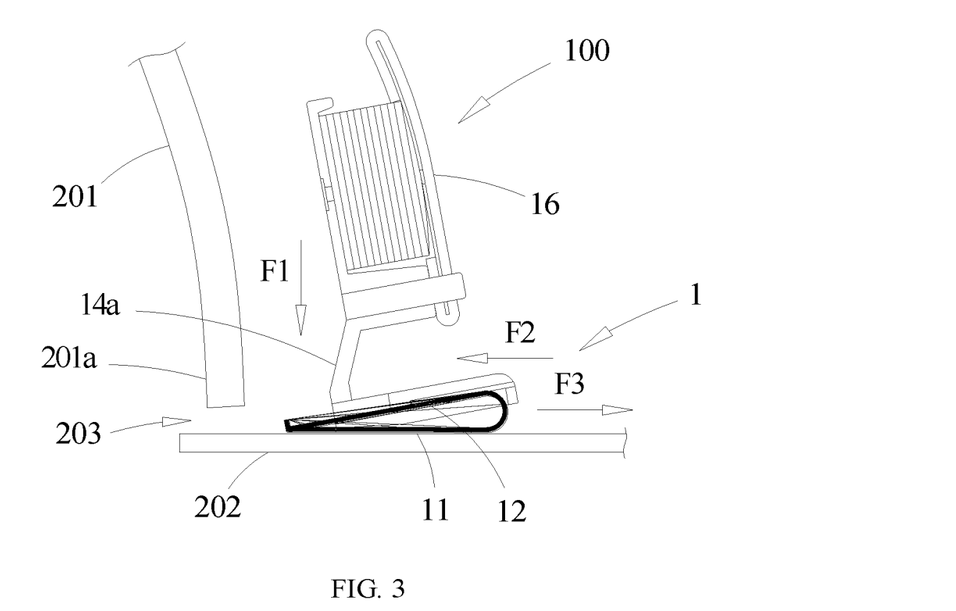
FIG. 3 is a schematic diagram showing the elastic fastener being under an applied force.

As shown in FIGS. 2 and 3, the elastic fastener 1 is naturally in the open state. However, when the elastic fastener 1 is under a pressing force F1, the first piece 11 is clung to the car window glass 202 to serve a supporting surface. In the meantime, the second piece 12 and the first piece 11 are forced to close. The indentation 11a formed on the outer opening 111 of the first piece 11 and the projection 12a formed on the outer opening 121 of the second piece 12 are superimposed to form a piece with a minimum one-piece thickness. When the pressing force F1 is removed, the elastic fastener 1 will be restored to the open state because of its restorative elasticity F.

Figure 5:
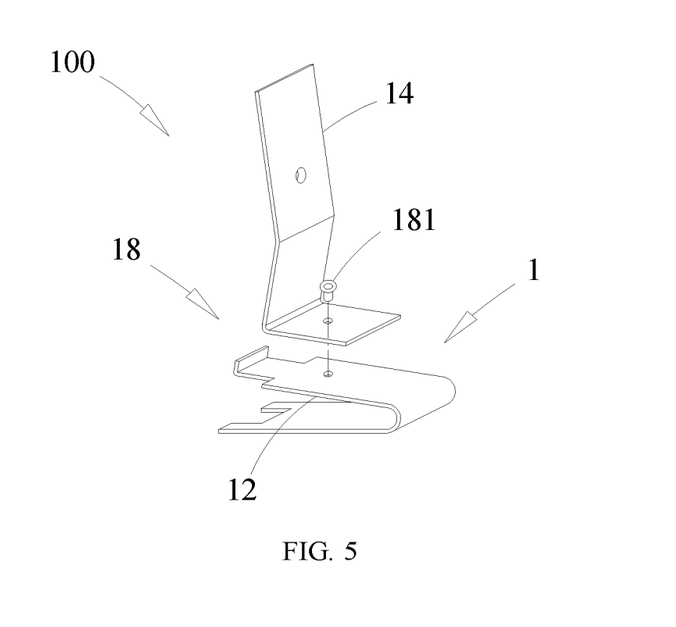
FIG. 5 is a schematic diagram showing the elastic fastener being riveted with a rivet according to the invention.
Figure 6:
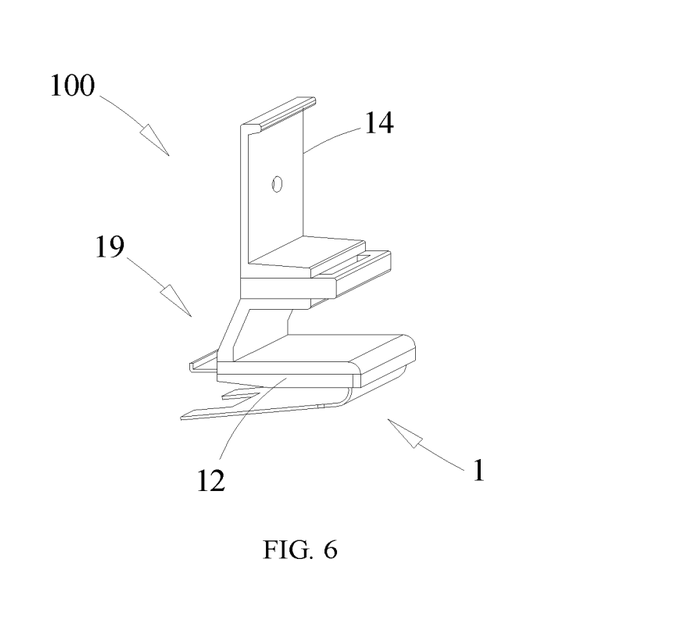
FIG. 6 is a schematic diagram showing the elastic fastener being fastened according to the invention.

The object jointer 14 is mounted on the second piece 12 of the elastic fastener 1 and may be integrated with the second piece 12 by way of different integrating methods, for example, by an integral forming process (indicated by the arrow 17 of FIG. 1), by a riveting process with a rivet 181 (indicated by the arrow 18 of FIG. 5), or by an inserting and clamping process (indicated by the arrow 19 of FIG. 6).

Figure 4:
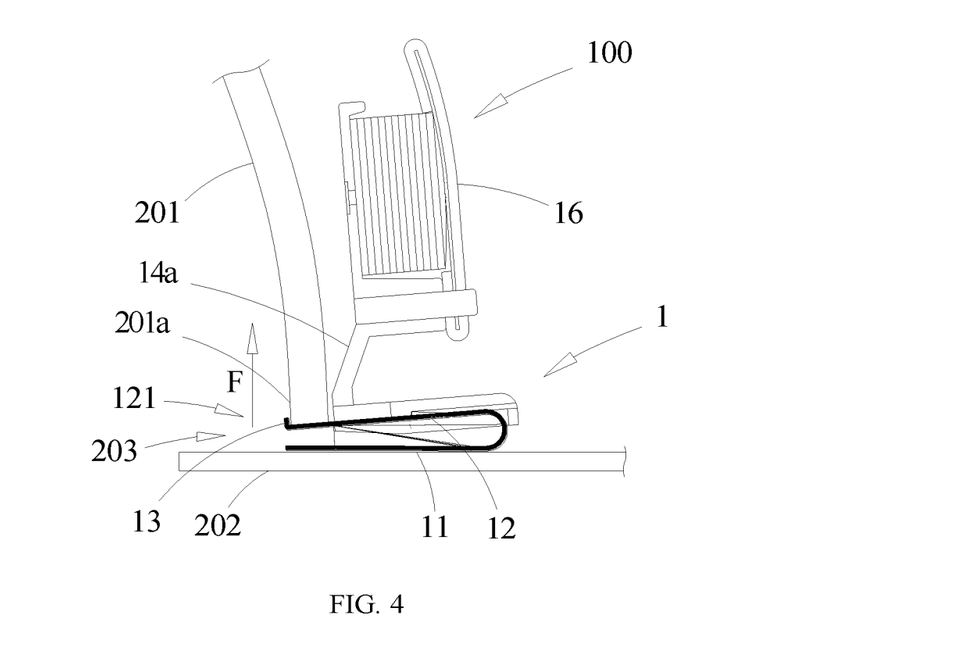
FIG. 4 is a schematic diagram showing the elastic fastener being fastened after the applied force is removed.

As shown in FIG. 3, a vertical pressing force F1 is applied to the second piece 12 of the elastic fastener 1 to completely close the second piece 12, and then a traverse pushing force F2 is applied to push the elastic fastener 1 into the gap 203 between the trim panel 201 and the car window glass 202. Afterwards, the vertical pressing force F1 and the traverse pushing force F2 are both released. Because the elastic fastener 1 has its elastic force F in nature (as shown in FIG. 4), the elastic fastener 1 can be restored to its naturally open state, such that the flange 13 is securely fastened to the inner side 201a of the trim panel 201.

As shown in FIG. 3, when it is desired to dismantle the elastic fastener assembly 100, a vertical pressing force F1 is needed to be applied to the second piece 12 of the elastic fastener 1 to completely close the second piece 12. Afterwards, a traverse pulling force F3 is applied to pull the closed elastic fastener 1 out of the gap 203 between the trim panel 201 and the car window glass 202. The dismantlement process is finished as the closed elastic fastener 1 is completely detached from the gap 203.

Figure 7:
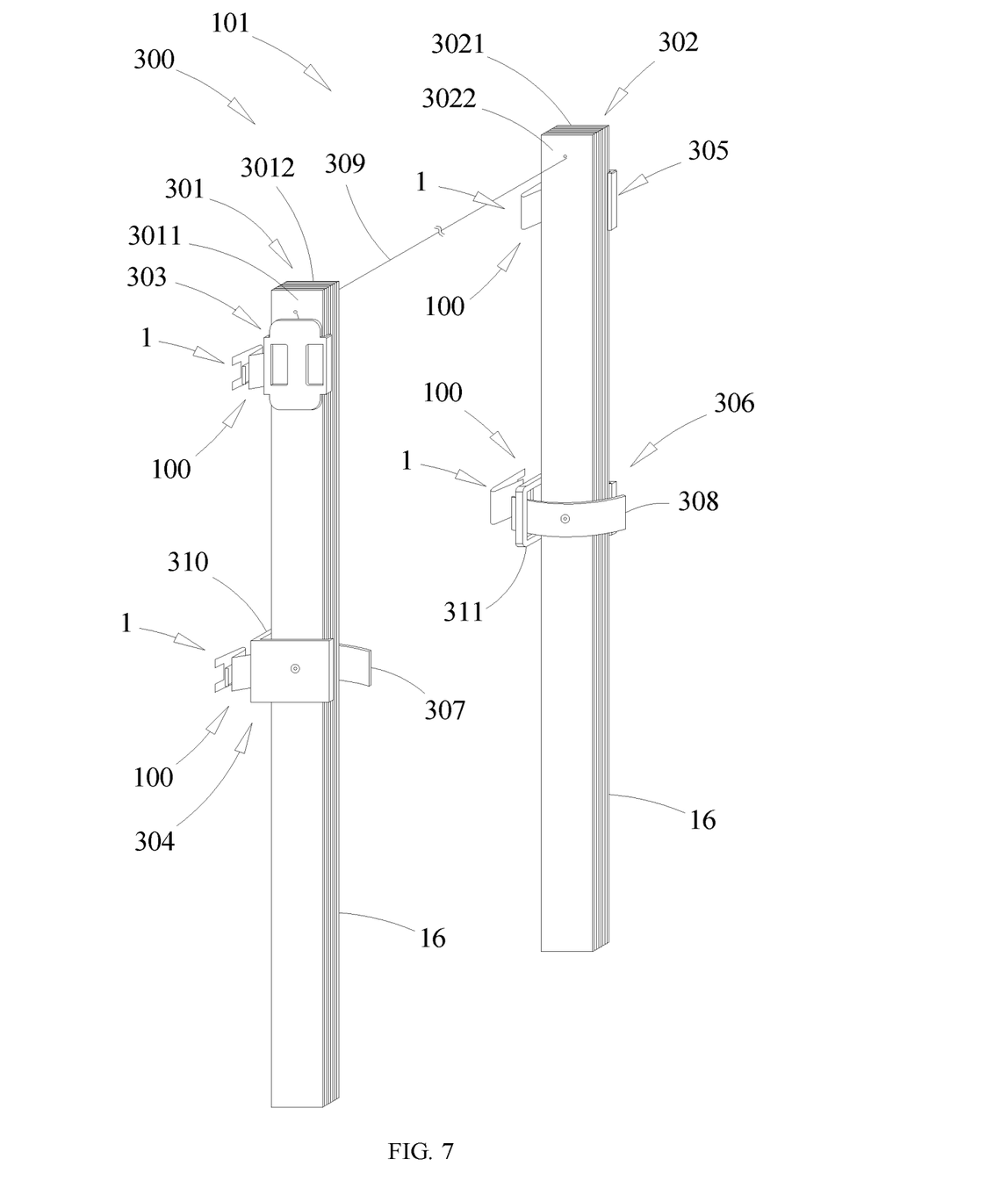
FIG. 7 is a schematic diagram showing the elastic fastener assembly being applied to a two-piece windshield pleated curtain according to a first embodiment of the invention.

Please refer to FIG. 7, which illustrates the first embodiment of the article 101 according to the invention. The article 101 is a two-piece front windshield pleated curtain composed of two objects 16 and four elastic fastener assemblies 100. These four elastic fastener assemblies 100 includes an upper-left elastic fastener assembly 303, a middle-left elastic fastener assembly 304, an upper-right elastic fastener assembly 305, and a middle-right elastic fastener assembly 306.

As shown in FIG. 7, the two-piece front windshield pleated curtain 300 includes a left pleated curtain 301 having an upper-left elastic fastener assembly 303 and a middle-left elastic fastener assembly 304 on its outer side 3011, and a left lug 307 on its inner side 3012. The position of the left lug 307 corresponds to the middle-left elastic fastener assembly 304 to allow the left lug 307 to be inserted into the lug positioning hole 310 of the middle-left elastic fastener assembly 304. The two-piece front windshield pleated curtain 300 further includes a right pleated curtain 302 having an upper-right elastic fastener assembly 305 and a middle-right elastic fastener assembly 306 on its outer side 3021, and a right lug 308 on its inner side 3022. The position of the right lug 308 corresponds to the middle-right elastic fastener assembly 306 to allow the right lug 308 to be inserted into the lug positioning hole 311 of the middle-right elastic fastener assembly 306. In addition, both the left lug 307 and the right lug 308 are each provided with an adhesive member for sticking with each other. The adhesive member can be male-female Velcro straps or male-female fastener.

Figure 8:
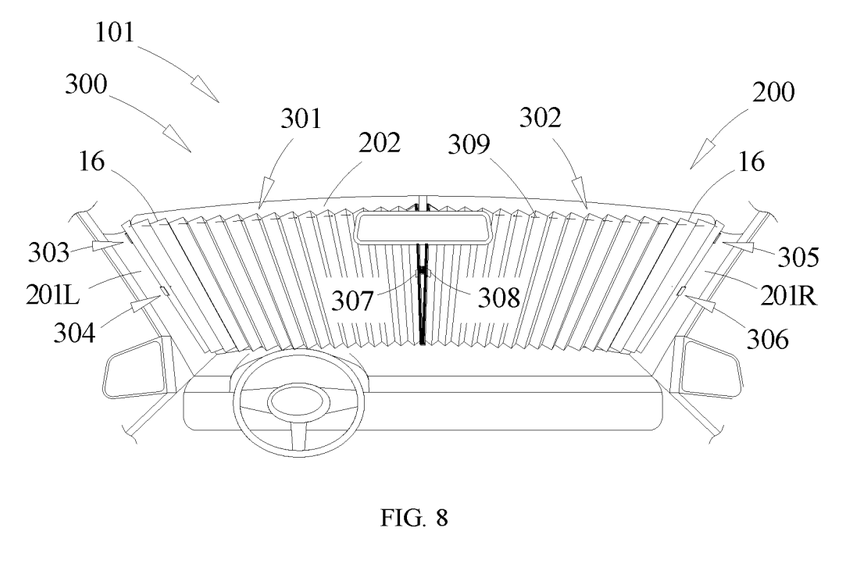
FIG. 8 is a schematic diagram showing the elastic fastener assembly being applied to a two-piece front windshield pleated curtain in a spread-out mode according to the first embodiment of the invention.

As shown in FIG. 8, the two objects 16 in this embodiment include the left pleated curtain 301 and the right pleated curtain 302. The upper-left elastic fastener assembly 303 and the middle-left elastic fastener assembly 304 on the left pleated curtain 301 of the object 16 are fastened in the gap 203 between the left trim panel 201L of the car 200 and the car window glass 202. The upper-right elastic fastener assembly 305 and the middle-right elastic fastener assembly 306 of the right pleated curtain 302 are fastened in the gap 203 between the right trim panel 201R of the car 200 and the car window glass 202.

As shown in FIG. 8, when the two-piece front windshield pleated curtain 300 is desired to spread out, the user uses the left hand to grasp the left lug 307 and uses the right hand to grasp the right lug 308, and moves both hands toward the center along the guide line 309, such that the left lug 307 and right lug 308 are stuck or fastened with each other. In this way, the windshield 202 of the car 200 can be shaded.

As shown in FIGS. 7 and 8, when the two-piece front windshield pleated curtain 300 is desired to fold, the user pulls the left lug 307 and the right lug 308 to move respective lug sideways to the farthest point the along the guide line 309, so as to allow the left lug 307 to be inserted into the lug positioning hole 310 of the middle-left elastic fastener assembly 304, and allow the right lug 308 to be inserted into the lug positioning hole 311 of the middle-right elastic fastener assembly 306, thereby finishing the folding process.

Figure 9:
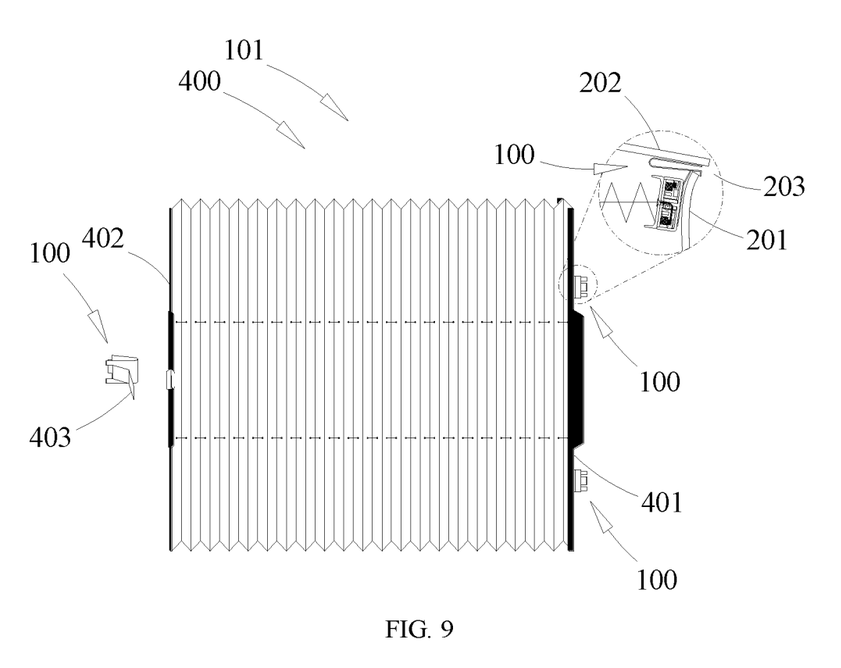
FIG. 9 is a schematic diagram showing the elastic fastener assembly being applied to a one-piece constant-force spring pleated curtain according to a second embodiment of the invention.

Please refer to FIG. 9, which illustrates a second embodiment of the article 101 according to the invention. The article 101 in this embodiment includes a one-piece constant-force spring pleated curtain 400 as the object 16 and three elastic fastener assemblies of the invention 100, in which two of them are securely installed on the fixed side 401 of the object 16. These two elastic fastener assemblies are used to be fastened in the gap 203 between trim panel 201 on one side of the car 200 and the car window glass 202. The other elastic fastener assembly is installed in the gap 203 between the trim panel on the other side of the car 200 and the car window glass 202. The second piece 12 of the elastic fastener 1 is provided with a positioning piece 403 for securing a free side 402. As a result, the free side 402 of the one-piece constant-force spring pleated curtain 400 can be fixed accordingly when the one-piece constant-force spring pleated curtain 400 is spreading out.

Figure 10:
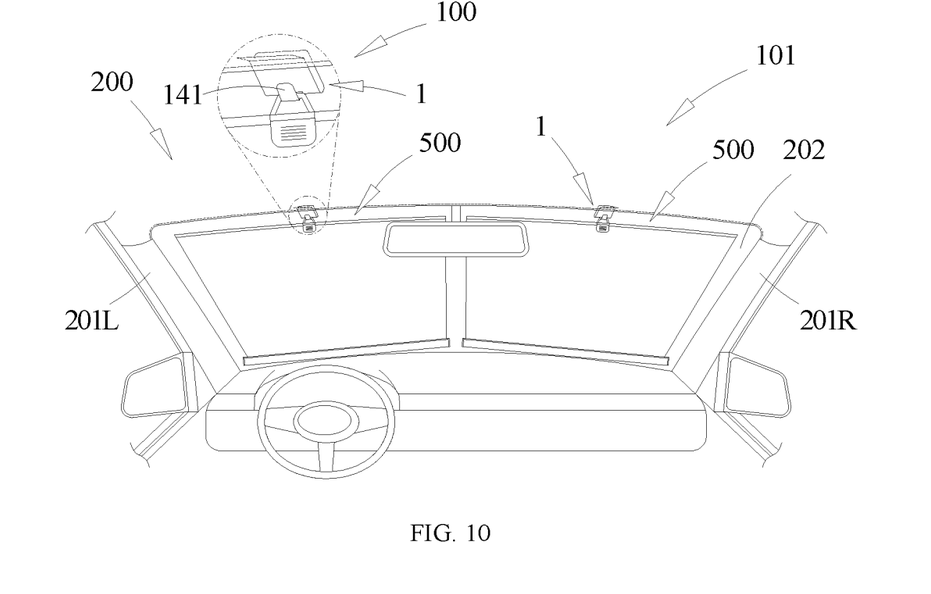
FIG. 10 is a schematic diagram showing the elastic fastener assembly being applied to a roller curtain according to a third embodiment of the invention.

Please refer to FIG. 10, which illustrates a third embodiment of the article 101 according to the invention. The article 101 in this embodiment includes a roller curtain 500 as the object 16. The object jointer 14 of the elastic fastener 1 of the elastic fastener assembly 100 can be shaped as a hook-type object jointer 141 that can be securely installed on the upper end of the car window glass for hanging a spread-out roller curtain 500.

In addition to the foregoing three embodiments, the elastic fastener assembly 100 of the invention can be applied to fasten driving recorder. In addition, the elastic fastener assembly 100 may be used to hang various kinds of articles, for example, parking certificate or hangable decoration.

Although the structure and the application of the inventive elastic fastener assembly have been described herein, it is to be noted that those of skill in the art will recognize that various modifications can be made within the spirit and scope of the present invention as further defined in the appended claims.

What is claimed is:

1. An elastic fastener assembly for fastening at least one object, comprising:
    an elastic fastener having a first piece and a second piece, the first piece being used to support the elastic fastener assembly, and the second piece being served as a fastener of the elastic fastener assembly and having an opening provided with a flange for allowing the elastic fastener to be inserted in a gap between a trim panel and a car window glass, thereby securely fastening the elastic fastener assembly to an inner side of the trim panel; and
    an object jointer mounted on a top surface or a side surface of the second piece for integrating with the second piece and having a shape formed according to requirements to fasten different objects;
    wherein one side of the object jointer is close to the flange and is in contact with the trim panel, and the other side of the object jointer is integrated with the at least one object; and
    a neck of the object jointer is spaced apart from the flange by a distance longer than a thickness of the trim panel, thereby ensuring the elastic fastener assembly to be fastened to the inner side of the trim panel during an installation process of the elastic fastener assembly.

2. The elastic fastener assembly according to claim 1, wherein the elastic fastener is made up of an elastic material having a U-shape, a V-shape, or an upside-down U-shape.

3. The elastic fastener assembly according to claim 1, wherein the first piece and the second piece both includes an outer opening having a flat and straight shape, and the outer opening of the first piece includes an indentation and the outer opening of the second piece includes a projection corresponding to the indentation, such that the outer openings interleave with each other and the thickness of the elastic fastener assembly is kept to be the thickness of one piece when the elastic fastener assembly is in a close state.

4. The elastic fastener assembly according to claim 1, wherein the second piece is integrated with the object jointer by an integral forming process, a riveting process, or by an inserting and clamping process.

5. The elastic fastener assembly according to claim 1, wherein the at least one object includes a left pleated curtain and a right pleated curtain, both of which are configured to be combined with a plurality of elastic fastener assemblies to form a two-piece front windshield pleated curtain for shading a windshield, and wherein the left pleated curtain is provided with an upper-left elastic fastener assembly and a middle-left elastic fastener assembly located on an outer side thereof and a left lug located on an inner side thereof, and the right pleated curtain is provided with an upper-right elastic fastener assembly and a middle-right elastic fastener assembly located on an outer side thereof, and a right lug located on an inner side thereof.

6. The elastic fastener assembly according to claim 1, wherein the elastic fastener assembly is fixedly installed on an upper end of the car window glass for fastening or hanging an object.

7. The elastic fastener assembly according to claim 1, wherein the at least one object includes a driving recorder, a one-piece constant-force spring pleated curtain, or a roller curtain.

8. The elastic fastener assembly according to claim 1, wherein the second piece includes a threaded bore for allowing a screw to be screwed thereinto to prop the first piece and the second piece open when the elastic fastener assembly is used to hang a relatively heavy article, thereby reinforcing fastening power of the elastic fastener assembly.

9. The elastic fastener assembly according to claim 1, wherein the first piece has a planar shape.

\* \* \* \* \*